United States Patent
Chiang et al.

(10) Patent No.: US 8,189,354 B2
(45) Date of Patent: May 29, 2012

(54) VOLTAGE CONVERTER WITH HIGH EFFICIENCY

(75) Inventors: Szu-Ming Chiang, Hsin-Chu (TW); Wei-Ming Chen, Hsin-Chu (TW); Chi-Hung Tsai, Hsin-Chu (TW)

(73) Assignee: Analog Integrations Corporation, Science Park, Hsin-Chu (TW)

( * ) Notice: Subject to any disclaimer, the term of this patent is extended or adjusted under 35 U.S.C. 154(b) by 262 days.

(21) Appl. No.: 12/709,524

(22) Filed: Feb. 22, 2010

(65) Prior Publication Data

US 2011/0103102 A1 May 5, 2011

(30) Foreign Application Priority Data

Nov. 2, 2009 (TW) ................................ 98137113 A

(51) Int. Cl.
*H02H 7/122* (2006.01)
*H02M 3/335* (2006.01)
(52) U.S. Cl. .................. 363/56.12; 363/56.11
(58) Field of Classification Search .................. 363/20, 363/21.01, 21.12, 21.17, 55, 56.01, 56.09, 363/56.1, 56.11, 56.12, 97
See application file for complete search history.

(56) References Cited

U.S. PATENT DOCUMENTS

| | | | |
|---|---|---|---|
| 5,260,607 A * | 11/1993 | Kinbara | 327/427 |
| 5,353,213 A * | 10/1994 | Paulik et al. | 363/19 |
| 5,883,795 A | 3/1999 | Farrington | |
| 6,115,271 A * | 9/2000 | Mo | 363/56.11 |
| 6,314,002 B1 | 11/2001 | Qian | |
| 6,421,255 B1 | 7/2002 | Frebel | |
| RE38,196 E * | 7/2003 | Vinciarelli et al. | 363/16 |
| 6,853,563 B1 * | 2/2005 | Yang et al. | 363/21.15 |

OTHER PUBLICATIONS

AI, IEEE ICSS2005 International Conference on Systems & Signals "A novel Integrated Nondissipative Snubber for Flyback Converter", 2005, p. 66-p. 71.

* cited by examiner

*Primary Examiner* — Gary L Laxton
(74) *Attorney, Agent, or Firm* — Winston Hsu; Scott Margo

(57) ABSTRACT

A voltage converter transmits energy in multiple stages using a charge pump so as to decrease the voltage rating of the secondary side of the transformer and reduce the size of the transformer. Meanwhile, the voltage converter stores and recycles the leakage inductance energy by using a snubber circuit so as to increase the efficiency.

39 Claims, 13 Drawing Sheets

VOLTAGE CONVERTER WITH HIGH EFFICIENCY

BACKGROUND OF THE INVENTION

1. Field of the Invention

The present invention is related to a voltage converter, and more particularly, to a flyback voltage converter with high efficiency.

2. Description of the Prior Art

Voltage converters are essential devices in modern electronic devices. They can convert the input voltage of an electronic device into different operating voltages for driving the loads. Among various types, flyback voltage converters are widely used due to high efficiency, low power consumption, small size and light weight.

FIGS. 1-3 illustrate the prior art flyback voltage converters 200a-200c. The flyback voltage converters 200a-200c each include a voltage source $V_{DC}$, a first electromagnetic device L1, a second electromagnetic device L2, a power switch SW, a switch control unit 210, and a rectifying circuit 230, and respectively include snubber circuits 240a-240c. The electromagnetic devices L1 and L2, which can be implemented using coupling inductors or transformers, is configured to convert an input voltage $V_{IN}$ into an output voltage $V_{OUT}$ for driving a load $R_{LOAD}$. The power switch SW can be a metal oxide semiconductor (MOS) transistor which selectively switches between ON state (short-circuited) or OFF state (open-circuited) according to a control signal $V_{GS}$. The rectifying circuit 230 includes a diode $D_O$ and an output capacitor $C_{OUT}$. When the power switch SW is turned on, the diode $D_O$ is reverse-biased and the current flowing through the first electromagnetic device L1 increases. The energy provided by the voltage source $V_{DC}$ is thus stored in the first electromagnetic device L1. When the power switch SW is turned off, the diode $D_O$ is forward-biased and the energy stored in the first electromagnetic device L1 is transferred or coupled to the second electromagnetic device L2 and is released to the output capacitor $C_{OUT}$ and the load by the second electromagnetic device L2.

The switch control unit 210 includes an error amplifier 112, a pulse width modulation (PWM) comparator 113, a driving unit 114, and a feedback circuit 120. The feedback circuit 120, including a plurality of resistors in series, can provide a corresponding feedback signal $V_{FB}$ by voltage-dividing the output voltage $V_{OUT}$. The error amplifier 112 can compare the feedback signal $V_{FB}$ $$\left(V_{FB} = V_{OUT} \times \frac{R_n}{R_1 + R_2 + \ldots + R_n}\right)$$

with a reference voltage $V_{REF}$, thereby providing a corresponding control signal $V_C$. According to the control signal $V_C$, the PWM comparator 113 generates a corresponding control signal $V_{PWM}$, according to which the driving unit 114 generates the control signal $V_{GS}$. In other words, the prior art flyback voltage converters 200a-200c adjust the duty cycle of the power switch SW according to the variations in the output voltage $V_{OUT}$ so as to maintain the output voltage $V_{OUT}$ at a target level.

However in real applications, the power switch SW is not an ideal device, and leakage inductance inevitably exists in the electromagnetic devices L1 and L2. After the power switch SW switches from ON state to OFF state and before the diode $D_O$ is completely turned on, a high induced voltage is established during this period since the current of the leakage inductance rapidly drops. This can cause a quite high voltage across the power switch SW. In order to prevent the power switch SW from breaking down, the prior art flyback voltage converters 200a-200c further include snubber circuits 240a-240c, respectively.

In the prior art flyback voltage converter 200a, the snubber circuit 240a includes a resistor $R_S$, a capacitor $C_S$, and a diode $D_S$. When the voltage on the power switch SW is higher than the preset voltage, the diode $D_S$ is turned on and the energy stored in the leakage inductance can be absorbed by the capacitor $C_S$. In other words, the capacitor $C_S$ can reduce the voltage on the power switch SW. Also, when the power switch SW is turned on in subsequent stage, the diode $D_S$ is turned off and the energy stored in the capacitor $C_S$ can be discharged by the resistor $R_S$. However, the prior art flyback voltage converter 200a has poor efficiency since the energy stored in the capacitor $C_S$ is dissipated by the resistor $R_S$.

In the prior art flyback voltage converter 200b, the snubber circuit 240b includes two TVS (transient voltage suppressor) diodes $D_Z$ and $D_S$. If the voltage on the power switch SW is higher than the preset voltage, the voltage on the power switch SW can be clamped by the TVS diodes $D_Z$ and $D_S$. In other words, the snubber circuit 240b can reduce the voltage on the power switch SW. However, the prior art flyback voltage converter 200b also has poor efficiency since the energy stored in the leakage inductance cannot be recycled.

In the prior art flyback voltage converter 200c, the snubber circuit 240c includes a capacitor $C_S$ and a power switch $Q_S$. When the power switch SW is turned off, the power switch $Q_S$ is turned on and the energy stored in the leakage inductance can be absorbed by the capacitor $C_S$. By properly controlling the turn-on time of the power switch $Q_S$, the energy stored in the capacitor $C_S$ can be transmitted to the voltage source $V_{DC}$ and the output capacitor $C_{OUT}$ for recycling, and the power switch SW can work at zero voltage switch-on condition. The prior art flyback voltage converter 200c can reduce switch loss of the power switch SW and improve efficiency. However, the snubber circuit 240c needs an additional power switch, and the switch control unit 210 needs two driving units 114a and 114b, which may increase manufacturing costs and circuit complexity.

SUMMARY OF THE INVENTION

The present invention provides a voltage converter which converts an input voltage into an output voltage for driving a load. The voltage converter comprises an input end for receiving the input voltage; an output end for outputting the output voltage; a first electromagnetic device configured to generate a corresponding first current according to the input voltage, the first electromagnetic device comprising a first end coupled to the input end and a second end; a second electromagnetic device having a first end and a second end for inducing a voltage corresponding to the first current and providing a second current associated with the output voltage; a power switch device coupled to the second end of the first electromagnetic device for controlling a signal transmission path between the second end of the first electromagnetic device and a power supply node according to a switch control signal; a snubber circuit coupled between the first end of the first electromagnetic device and the power supply node for storing a leakage inductance energy of the first electromagnetic device and providing a zero-current signal associated with the second current; and a switch control unit for generating the switch control signal according to a feedback signal and the zero-current signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
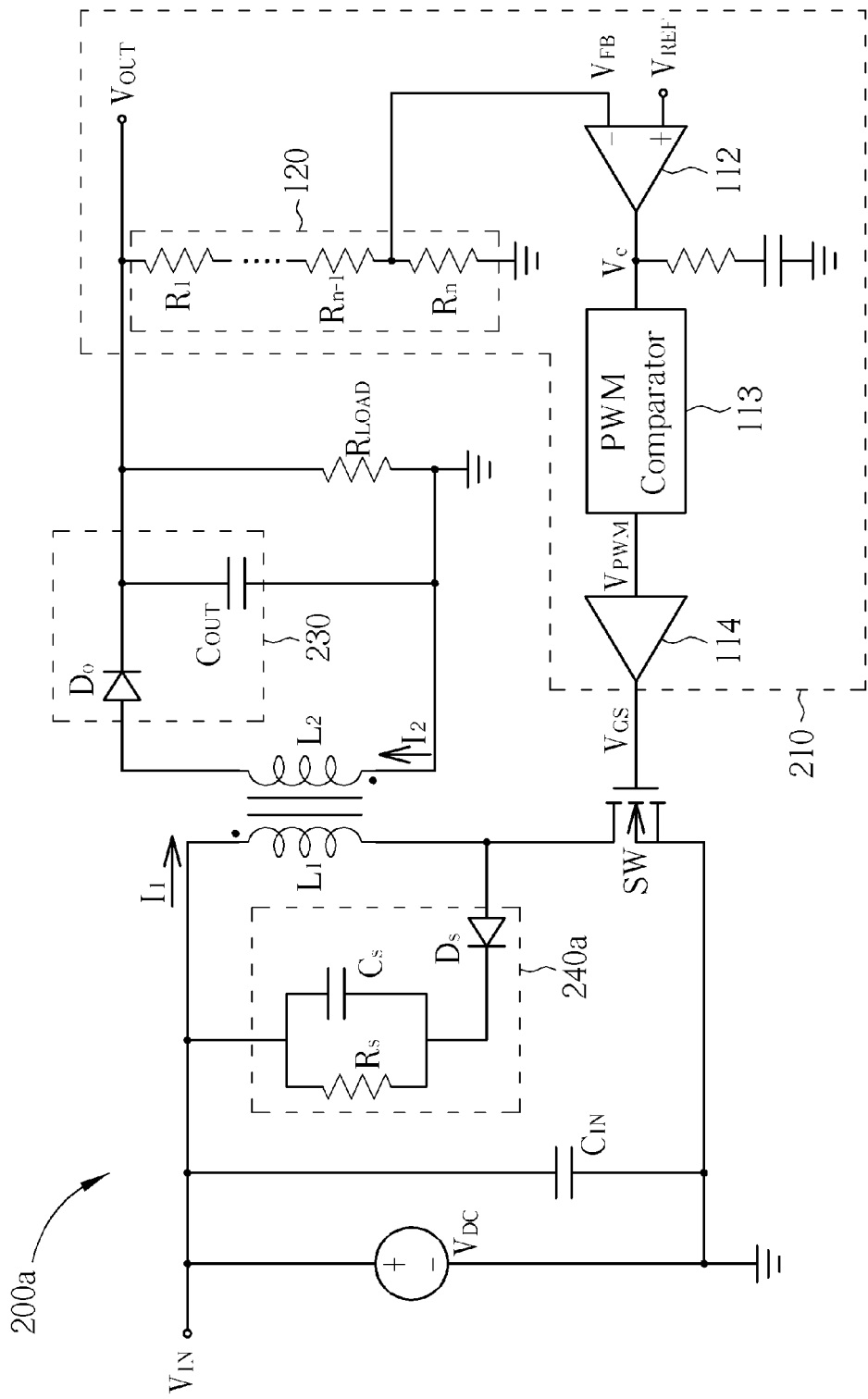
FIGS. 1-3 are diagrams illustrating prior art flyback voltage converters.
Figure 2:
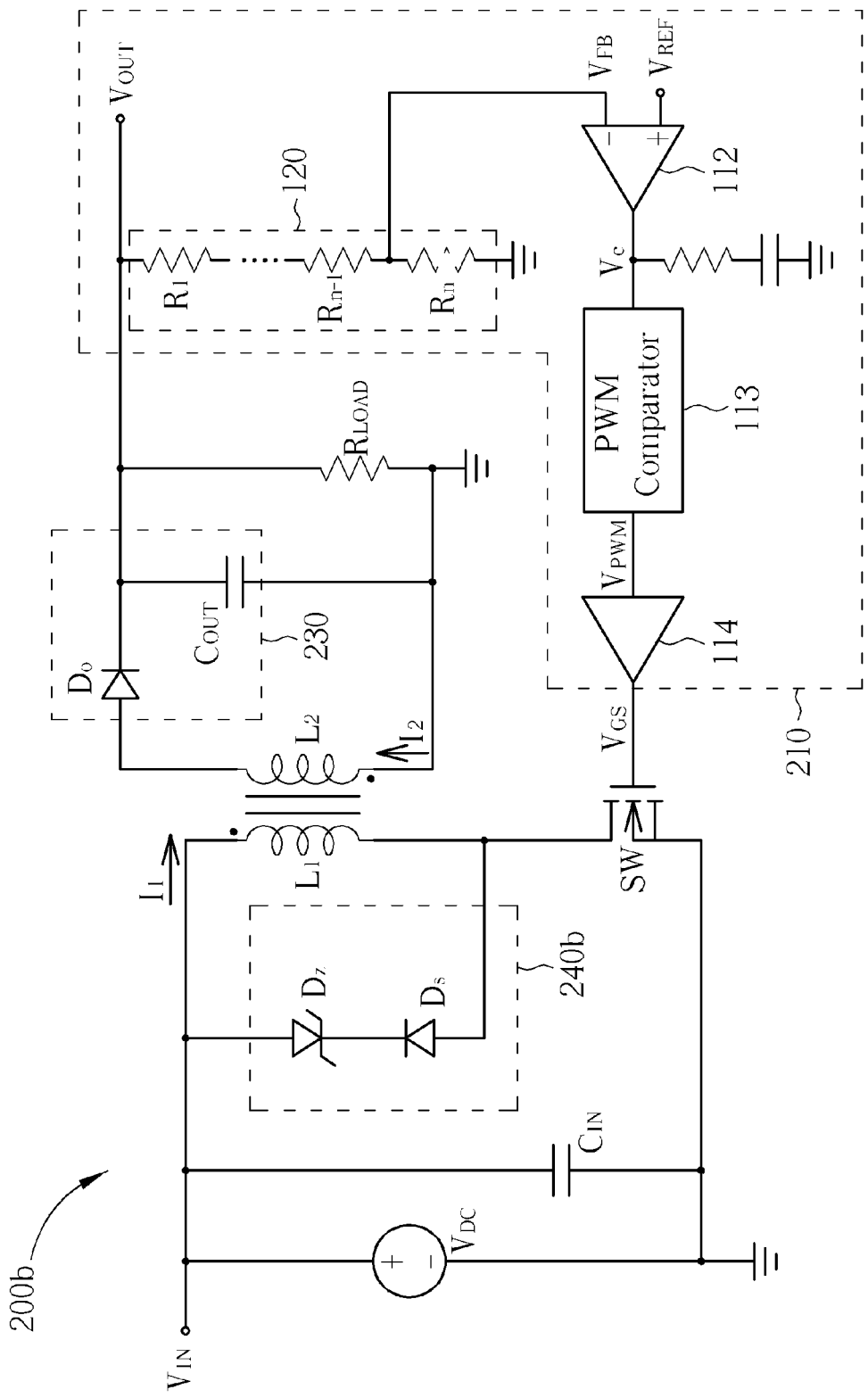
Figure 3:
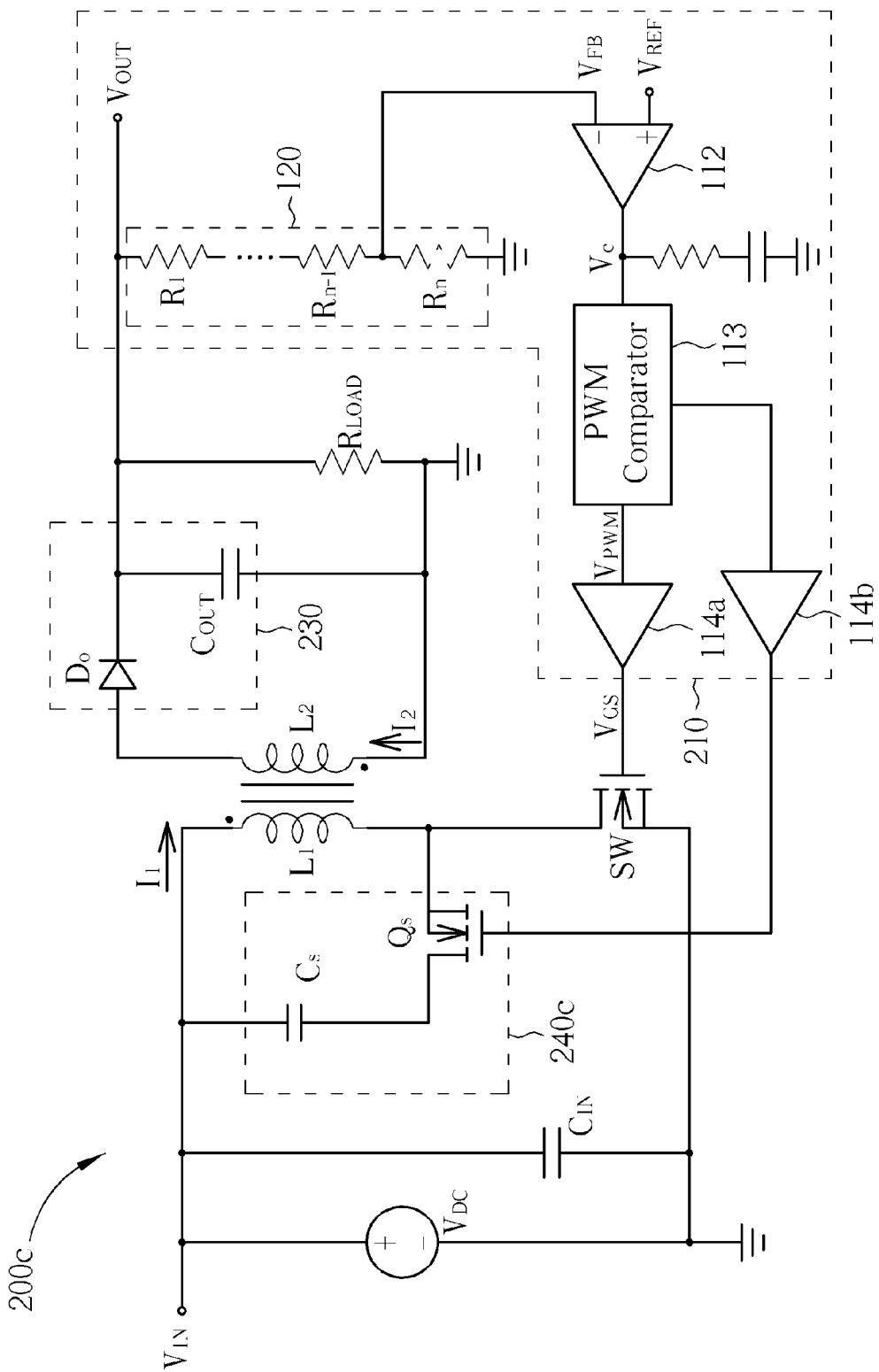
Figure 4:
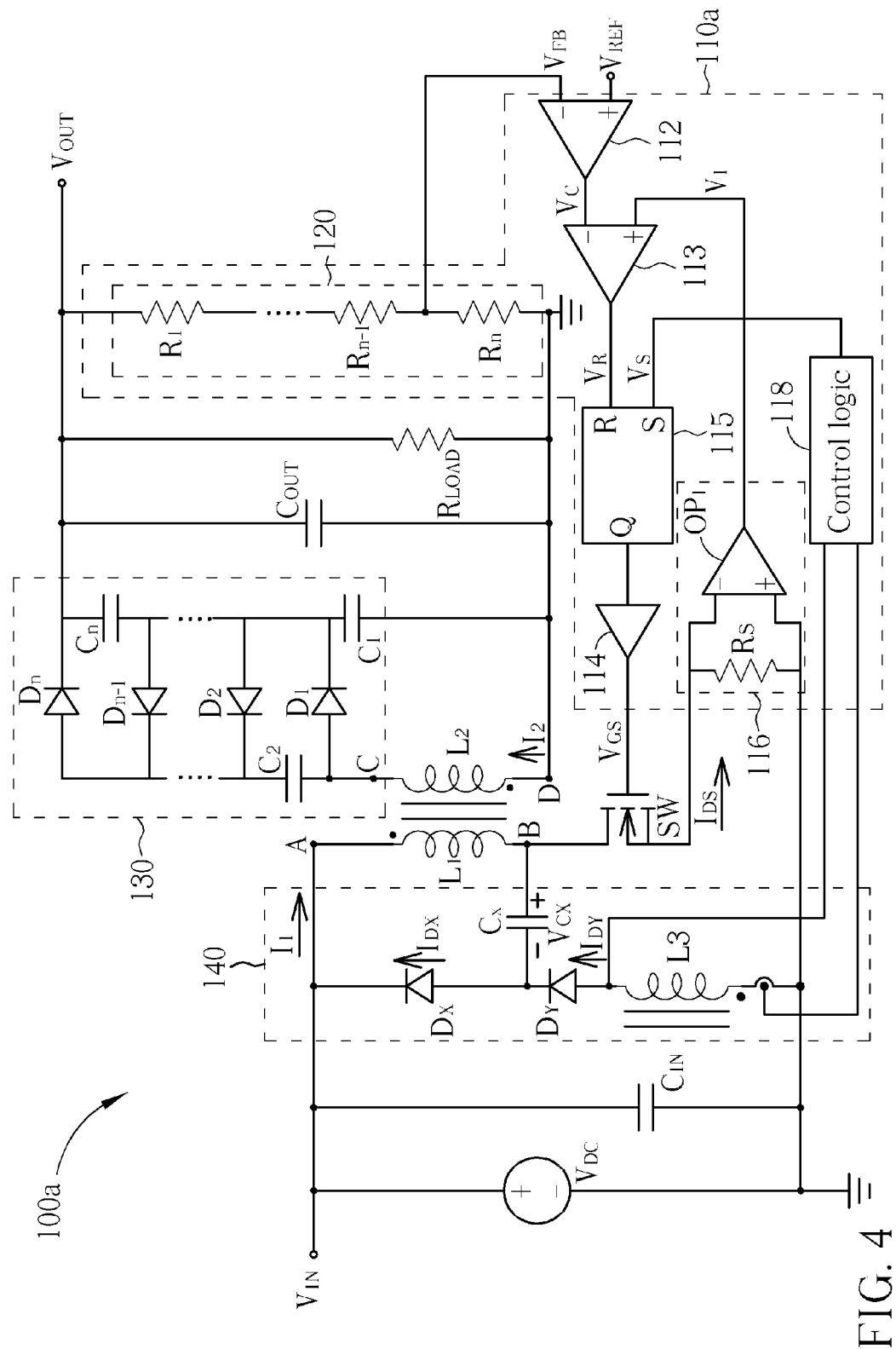
FIGS. 4-10, 12 and 13 are diagrams illustrating embodiments of a flyback voltage converter according to the present invention.

FIG. 4 illustrates a flyback voltage converter 100a according to a first embodiment of the present invention. The flyback voltage converter 100a includes a voltage source $V_{DC}$, a first electromagnetic device L1, a second electromagnetic device L2, a power switch SW, a switch control unit 110a, a charge pump 130, and a snubber circuit 140. The electromagnetic devices L1 and L2, which can be implemented by using coupling inductors or transformers, is configured to convert an input voltage $V_{IN}$ into an output voltage $V_{OUT}$ for driving a load $R_{LOAD}$. The power switch SW may be, but not limited to, a MOS transistor which selectively switches between ON state or OFF state according to a control signal $V_{GS}$. The charge pump 130, including a plurality of diodes $D_1$-$D_n$ and a plurality of output capacitor $C_1$-$C_n$, is configured to provide the output voltage $V_{OUT}$. The operation of the charge pump 130 will be described in more detail in subsequent paragraphs.

The electromagnetic devices L1 and L2 may be two inductor coils of a transformer. The output voltage $V_{OUT}$ can be regulated by adjusting the turn-ratio of L1 to L2 and the duty cycle of the power switch SW. For the first electromagnetic device L1 disposed at the primary side of the transformer and the second electromagnetic device L2 disposed at the secondary side of the transformer, a first node (node A) of the first electromagnetic device L1 and a second node (node D) of the second electromagnetic device L2 correspond to the same polarity, while a second node (node B) of the first electromagnetic device L1 and a first node (node C) of the second electromagnetic device L2 correspond to the same polarity. The currents flowing through the electromagnetic devices L1 and L2 are represented by I1 and I2, respectively. When the power switch SW is turned on, the first node A of the first electromagnetic device L1 is coupled to the voltage source $V_{DC}$, the second node B of the first electromagnetic device L1 is coupled to ground by the power switch SW, and the inductor current I1 increases. A part of the energy provided by the voltage source $V_{DC}$ is stored in the first electromagnetic device L1, and other part of the energy provided by the voltage source $V_{DC}$ is provided to charge the capacitors $C_2$, $C_4$, ..., $C_{n-1}$ (assuming n is an odd number) via the diodes $D_2$, $D_4$, ..., $D_{n-1}$ and the capacitors $C_1$, $C_3$, ..., $C_{n-2}$. At this time, the voltage on the second node D of the second electromagnetic device L2 is higher than the voltage on the first node C and the diodes $D_1$, $D_3$, ..., $D_n$ are thus reverse-biased. When the power switch SW leaves ON state and enters OFF state, the energy stored in the first electromagnetic device L1 is coupled to the second electromagnetic device L2, and the inductor current I1 rapidly drops to zero. According to electromagnetic principles, the voltage on the second node D of the second electromagnetic device L2 becomes lower than the voltage on the first node C at this time, and the diodes $D_1$, $D_3$, ..., $D_n$ are turned on. The energy stored in the second electromagnetic device L2 is then released to the capacitors $C_1$, $C_3$, ..., $C_n$ via the diodes $D_1$, $D_3$, ..., $D_n$ and the capacitors $C_2$, $C_4$, ..., $C_{n-1}$. The output voltage $V_{OUT}$ can be represented as follows:

$$V_{OUT} = V_{C1} + V_{C3} + \ldots + V_{CN},$$

where $$V_{C2} \approx V_{C3} \approx \ldots \approx V_{CN} \approx \left(V_{C1} + \frac{N_2}{N_1} V_{DC}\right)$$

and $N_2/N_1$ is the turn-ratio of $L_2$ to $L_1$.

When the power switch SW is turned on, the voltage across the secondary side of the transformer is about $(N_2/N_1)^* V_{DC}$; when the power switch SW is turned off, the voltage across the secondary side of the transformer is about $V_{C1}$. Hence, the present invention can decrease the voltage rating of the secondary side of the transformer and reduce the size of the transformer.

The switch control unit 110a includes an error amplifier 112, a PWM comparator 113, a driving unit 114, a flip-flop 115, a current-detecting circuit 116, a control logic 118 and a feedback circuit 120. The feedback circuit 120, including a plurality of resistors $R_1$-$R_n$ in series, can provide a corresponding feedback voltage $V_{FB}$ by voltage-dividing the output voltage $V_{OUT}$. The error amplifier 112 can compare the feedback voltage $V_{FB}$ $$\left(V_{FB} = V_{OUT} \times \frac{R_n}{R_1 + R_2 + \ldots + R_n}\right)$$

with a reference voltage $V_{REF}$, thereby providing a corresponding control signal $V_C$. The current-detecting circuit 116, including a current amplifier $OP_1$ and a resistor $R_S$, can provide a corresponding current-detecting signal $V_I$ by monitoring the current $I_{DS}$ flowing through the power switch SW. The control logic 118 can provide a corresponding control signal $V_S$ by monitoring the zero-current signal of the snubber circuit 140, wherein the zero-current signal indicates when the current flowing through a third winding and the current flowing through the secondary winding reduce to zero. The PWM comparator 113 generates a corresponding control signal $V_R$ according to the control signals $V_C$ and $V_I$. The flip-flop 115 can be an RS flip-flop which controls the driving unit 114 according to the control signals $V_R$ and $V_S$, thereby adjusting the duty cycle of the control signal $V_{GS}$.

Meanwhile, the snubber circuit 140 is configured to store and recycle the leakage inductance energy. The snubber circuit 140 includes a third electromagnetic device L3 (e.g., the third winding of the transformer), a capacitor $C_X$, and two diodes $D_X$ and $D_Y$. The current flowing through the capacitor $C_X$ is represented by $I_{CX}$, and the voltage on the capacitor $C_X$ is represented by $V_{ex}$. The current $I_{CX}$ is the sum of a diode current $I_{DX}$ (the current flowing through the diode $D_X$) and a resonant current $I_{DY}$ (the current flowing through the diode $D_Y$). For illustrative purpose, when the current flows in a direction as indicated by the arrow in FIG. 4, this current is described to have a positive value. Therefore, the relationship between the currents $I_{CX}$, $I_{DX}$ and $I_{DY}$ can be depicted as follows:

$$I_{CX} = I_{DX} - I_{DY}$$

Figure 11:
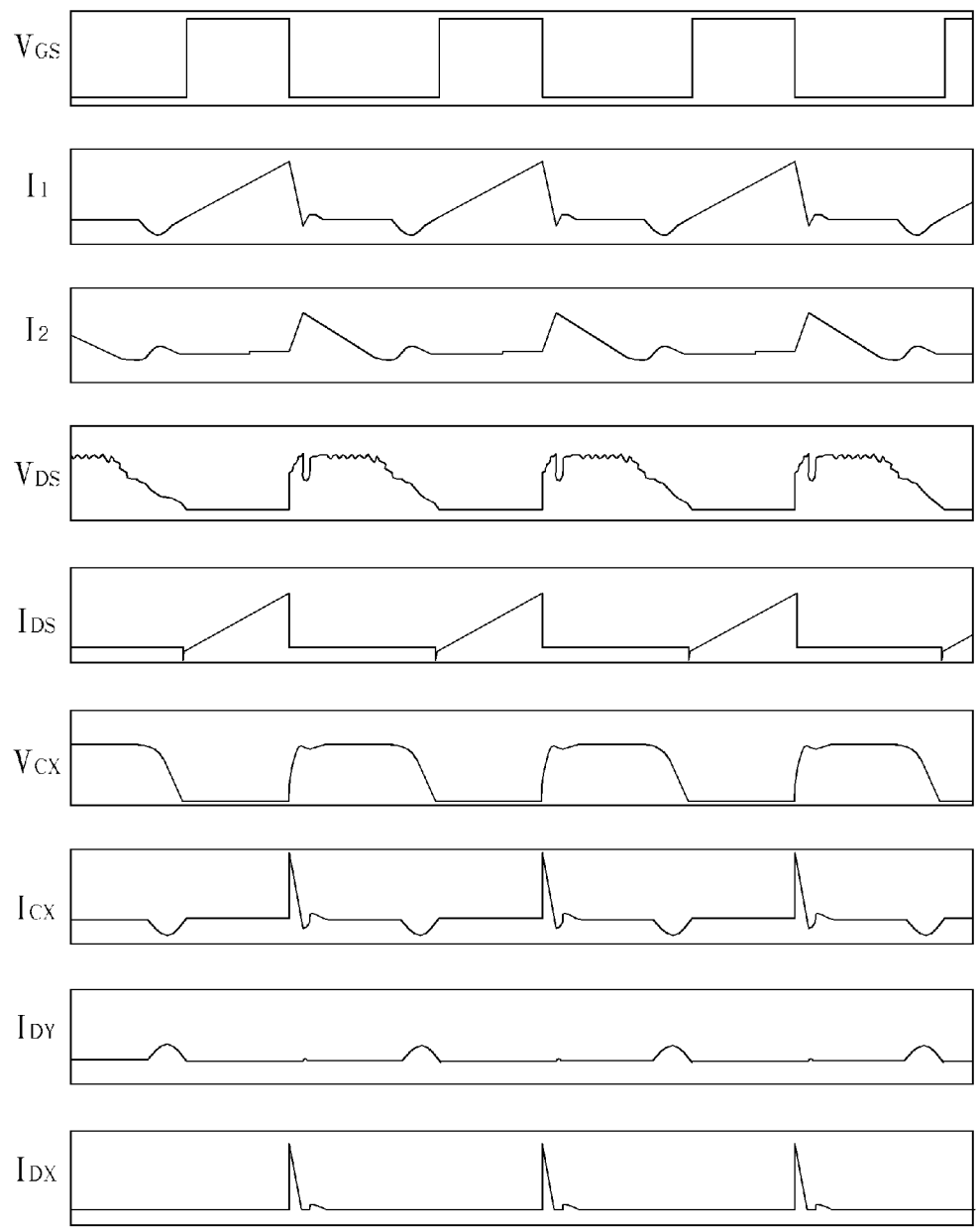
FIG. 11 is a timing diagram illustrating the operation of the flyback voltage converter according to the present invention.

Please refer to both FIG. 4 and FIG. 11 for illustrating the operation of the first embodiment of the present invention. FIG. 11 is a timing diagram illustrating the operation of the snubber circuit 140 in the first embodiment of the present invention. As previously described, the current I1 flowing through the first electromagnetic device L1 and the current $I_{DS}$ flowing through the power switch SW continuously increase when the power switch SW is in ON state ($V_{GS}$ is at high level). When the power switch SW is turned off, the energy stored in the first electromagnetic device L1 is coupled to the second electromagnetic device L2. The current I2 flowing through the second electromagnetic device L2 rapidly increases, the energy stored in the second electromagnetic device L2 is transmitted to the output end by the charge pump 130.

The error amplifier 112 generates the corresponding control signal $V_c$ according to the difference between the feedback signal $V_{FB}$ and the reference signal $V_{REF}$. When the current-detecting signal $V_I$ exceeds the control signal $V_C$, the flip-flop 115 controls the driving unit 114 for generating a low-level control signal $V_{GS}$, thereby turning off the power switch SW. The current-detecting signal $V_I$ is associated with the current I1 at the primary side and the feedback signal $V_{FB}$ is associated with the output voltage $V_{OUT}$. Therefore in the first embodiment of the present invention, the switch control unit 110a turns off the power switch SW according to both the current I1 at the primary side and the output voltage $V_{OUT}$.

When the control signal $V_{GS}$ changes from high level to low level, the power switch leaves On state and enters OFF state, during which the current $I_{DS}$ flowing through the power switch SW rapidly drops and the current $I_{DX}$ rapidly increases before the diode $D_1$ is completely turned on. The present invention can store the leakage inductance energy into the capacitor $C_X$ of the snubber circuit 140 via the first electromagnetic device L1, the capacitor $C_X$ and the diode $D_X$. After the current $I_2$ at the secondary side reduces to zero, the capacitor $C_X$ generates a resonant current $I_{DY}$, and the energy stored in the capacitor $C_X$ is delivered back to the voltage source $V_{DC}$. Meanwhile, the control logic 118 detects the resonant current $I_{DY}$ flowing through the third electromagnetic device L3 after the current $I_2$ at the secondary side reduces to zero. After the resonant current $I_{DY}$ reduces to zero, the control logic 118 controls the driving unit 114 for generating a high-level control signal $V_{GS}$, thereby turning on the power switch SW. In other words, the switch control unit 110a in the first embodiment of the present invention turns on the power switch SW according to both the current I2 at the secondary side and the resonant current $I_{DY}$. The voltage on the power switch SW has a minimal value when the resonant current $I_{DY}$ reduces to zero. In the first embodiment of the present invention, the power switch SW is turned on only when the resonant current $I_{DY}$ reduces to zero. Therefore, the switching loss of the power switch SW can be reduced, resulting in higher efficiency.

Figure 5:
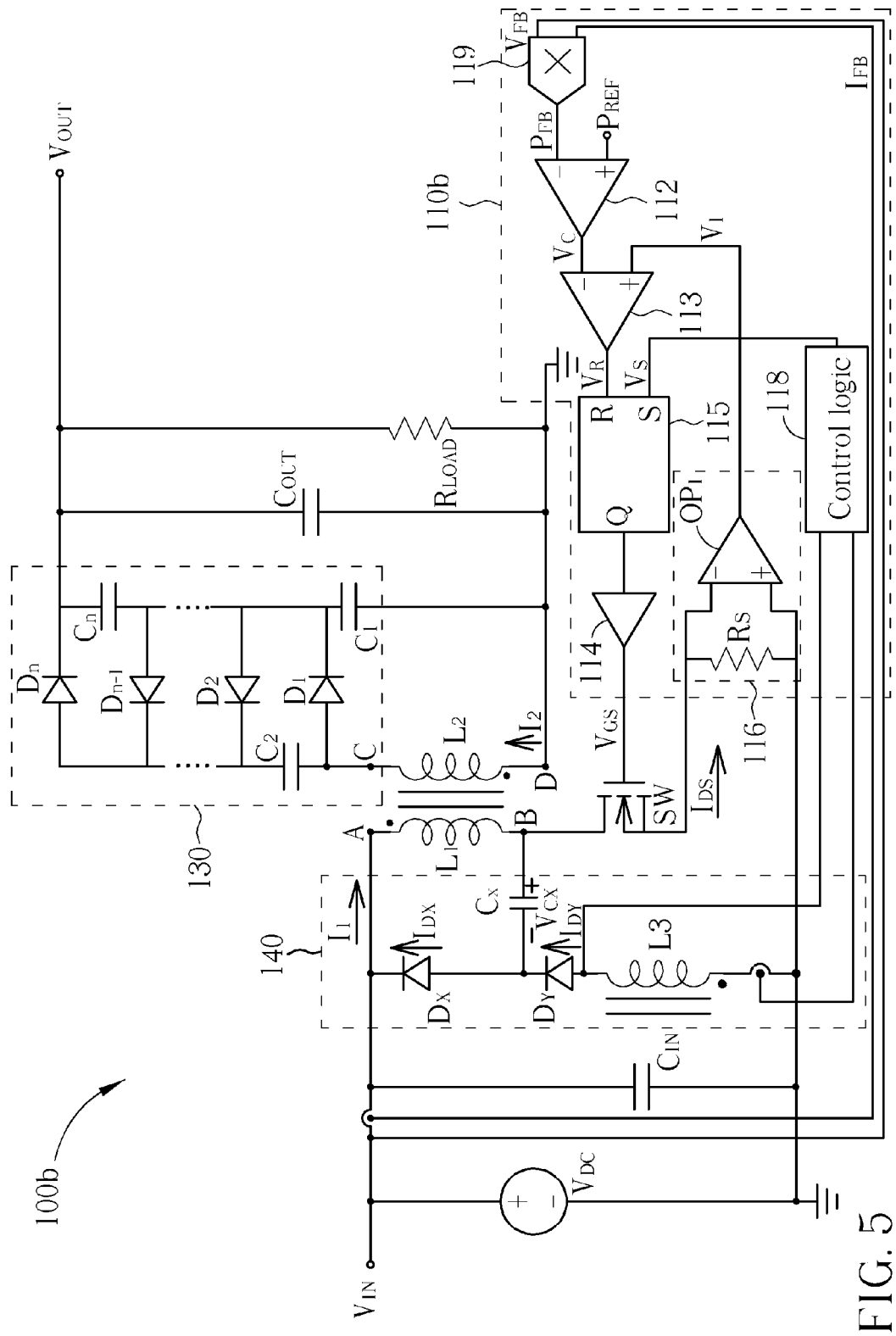

FIG. 5 illustrates a flyback voltage converter 100b according to a second embodiment of the present invention. The flyback voltage converter 100b includes a voltage source $V_{DC}$, a first electromagnetic device L1, a second electromagnetic device L2, a power switch SW, a switch control unit 110b, a charge pump 130, and a snubber circuit 140. The first and second embodiments of the present invention have similar structures, but differ in the switch control units 110a and 110b. In the switch control unit 110a according to the first embodiment of the present invention, the feedback circuit 120 provides the corresponding feedback signal $V_{FB}$ by voltage-dividing the output voltage $V_{OUT}$. The error amplifier 112 then provides the corresponding control signal $V_C$ according to the difference between the feedback signal $V_{FB}$ and the reference signal $V_{REF}$. On the other hand, the switch control unit 110b according to the second embodiment of the present invention further includes a multiplier 119 coupled to the voltage source $V_{DC}$ for providing a feedback signal $P_{FB}$ associated with the multiple of input current and the input voltage $V_{IN}$. The error amplifier 112 then provides the corresponding control signal $V_O$ according to the difference between the feedback signal $P_{FB}$ and a reference signal $P_{REF}$. In other words, the switch control unit 110b according to the second embodiment of the present invention selectively turns on or turns off the power switch SW according to the input power.

Figure 6:
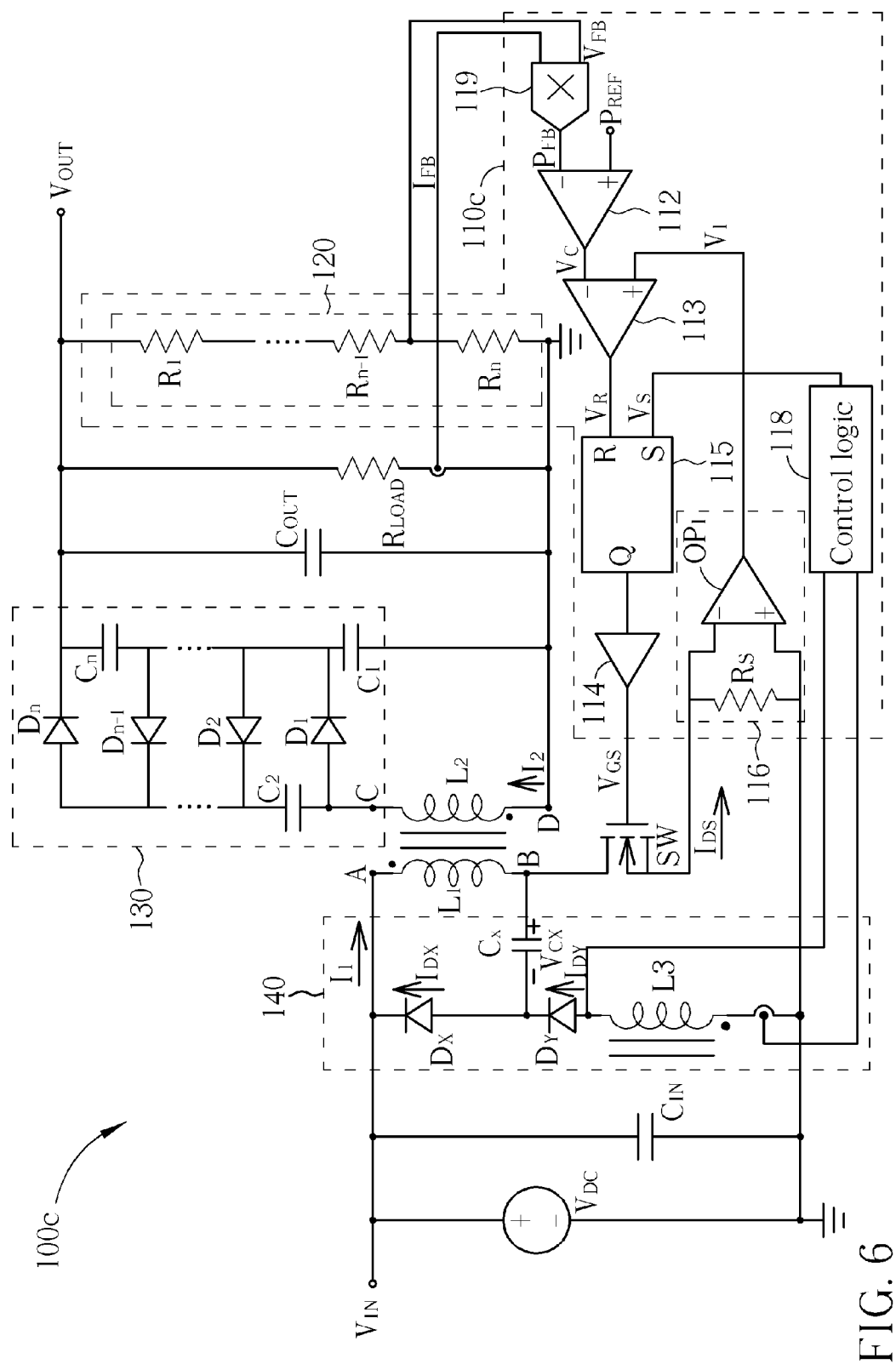

FIG. 6 illustrates a flyback voltage converter 100c according to a third embodiment of the present invention. The flyback voltage converter 100c includes a voltage source $V_{DC}$, a first electromagnetic device L1, a second electromagnetic device L2, a power switch SW, a switch control unit 110c, a charge pump 130, and a snubber circuit 140. The first and third embodiments of the present invention have similar structures, but differ in the switch control units 110a and 110c. In the switch control unit 110a according to the first embodiment of the present invention, the feedback circuit 120 provides the corresponding feedback signal $V_{FB}$ by voltage-dividing the output voltage $V_{OUT}$. The error amplifier 112 then provides the corresponding control signal $V_O$ according to the difference between the feedback signal $V_{FB}$ and the reference signal $V_{REF}$. On the other hand, the switch control unit 110c according to the third embodiment of the present invention further includes a multiplier 119 coupled to the feedback circuit 120 and the load $R_{LOAD}$ for providing a feedback signal $P_{FB}$ associated with the multiple of load current and the output voltage $V_{OUT}$. The error amplifier 112 then provides the corresponding control signal $V_C$ according to the difference between the feedback voltage $P_{FB}$ and a reference signal $P_{REF}$. In other words, the switch control unit 110c according to the third embodiment of the present invention selectively turns on or turns off the power switch SW according to the output power.

Figure 7:
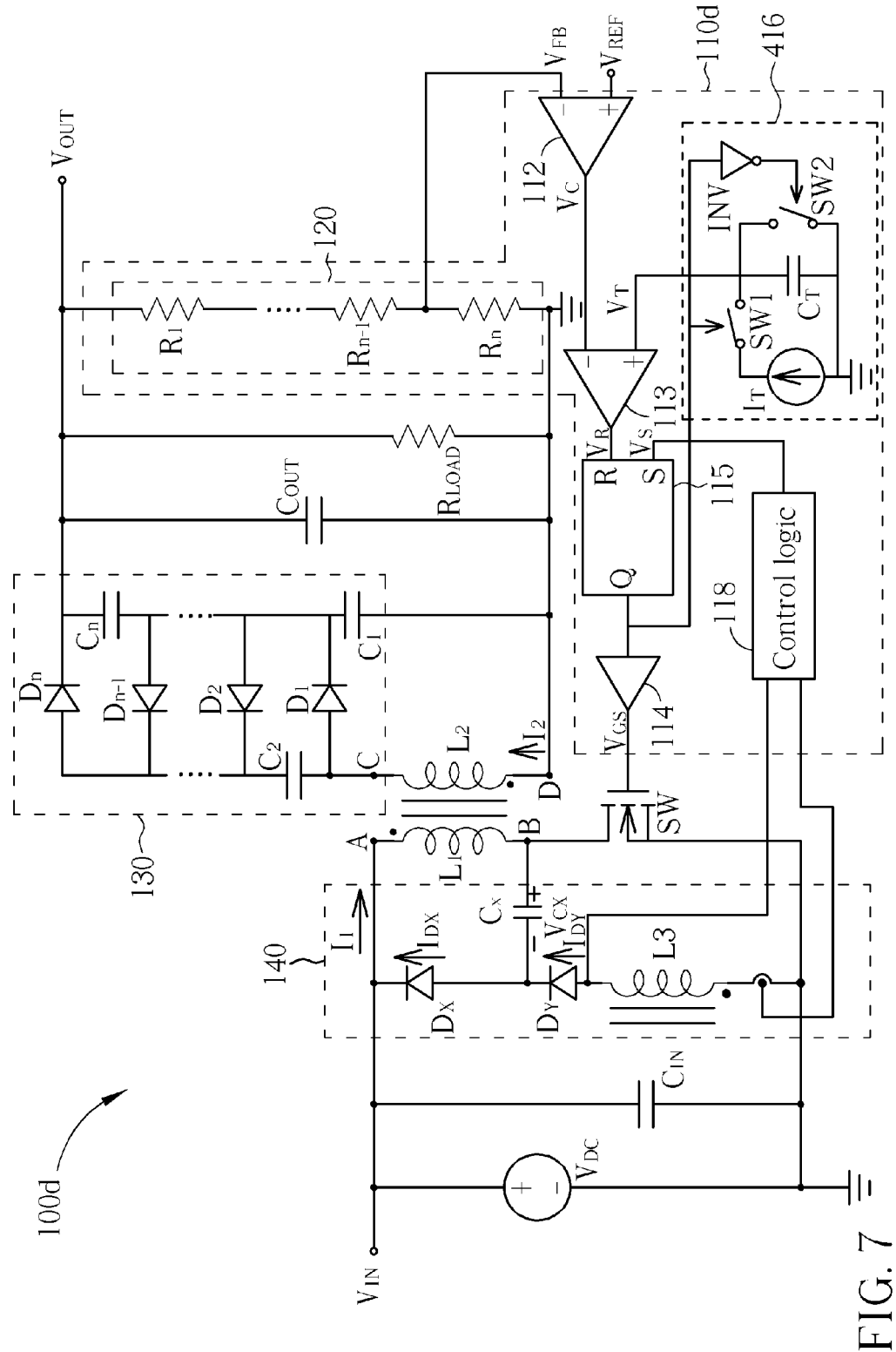

FIG. 7 illustrates a flyback voltage converter 100d according to a fourth embodiment of the present invention. The flyback voltage converter 100d includes a voltage source $V_{DC}$, a first electromagnetic device L1, a second electromagnetic device L2, a power switch SW, a switch control unit 110d, a charge pump 130, and a snubber circuit 140. The first and fourth embodiments of the present invention have similar structures, but differ in the switch control units 110a and 110d. In the switch control unit 110a according to the first embodiment of the present invention, the current-detecting circuit 116 provides the corresponding current-detecting signal $V_I$ by detecting the current $I_{DS}$ flowing through the power switch SW; in the switch control unit 110d according to the fourth embodiment of the present invention, a signal-generating circuit 416 is adopted for providing a compare signal $V_T$. The signal-generating circuit 416 includes a current source $I_T$, an inverter INV, a capacitor $C_T$ and two switches SW1 and SW2. The switches SW1 and SW2 operate according to control signals having opposite phases: when the switch SW1 is turned on and the switch SW2 is turned off, the current source $I_T$ charges the capacitor $C_T$, thereby providing the compare signal $V_T$; when the switch SW2 is turned on and the switch SW1 is turned off, the capacitor $C_T$ is discharged by the switch SW2, thereby resetting the compare signal $V_T$.

Figure 8:
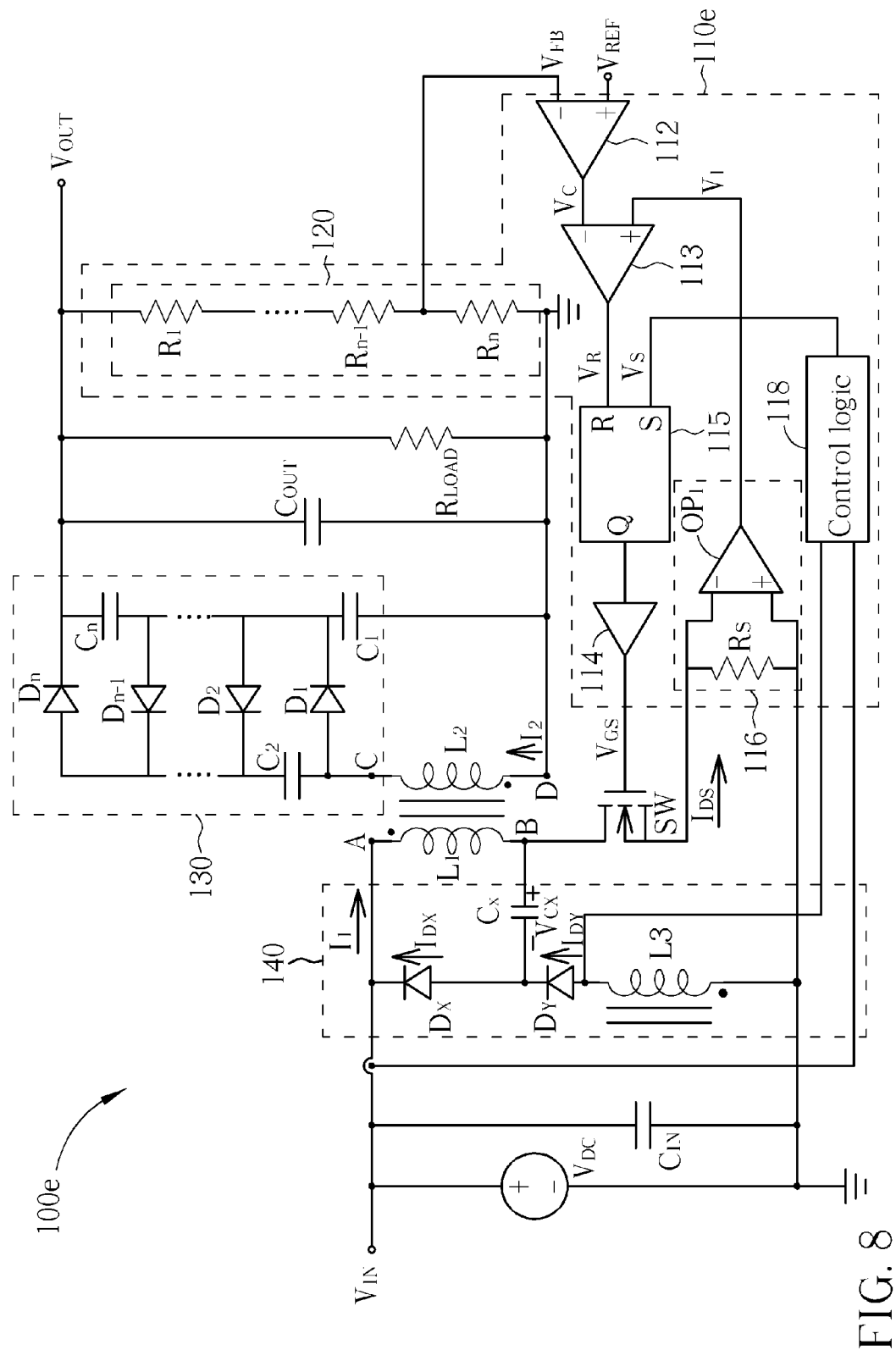
Figure 9:
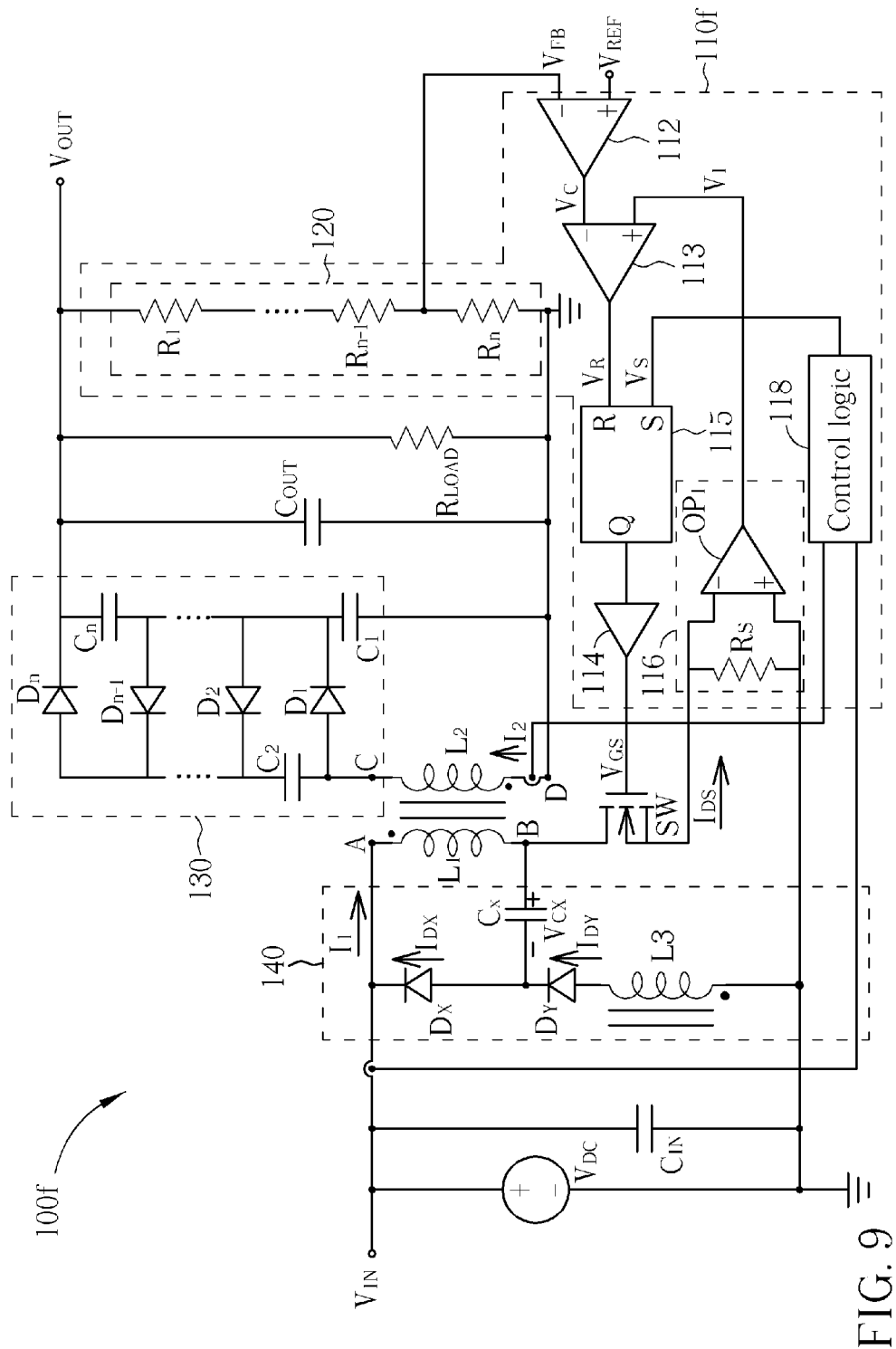
Figure 10:
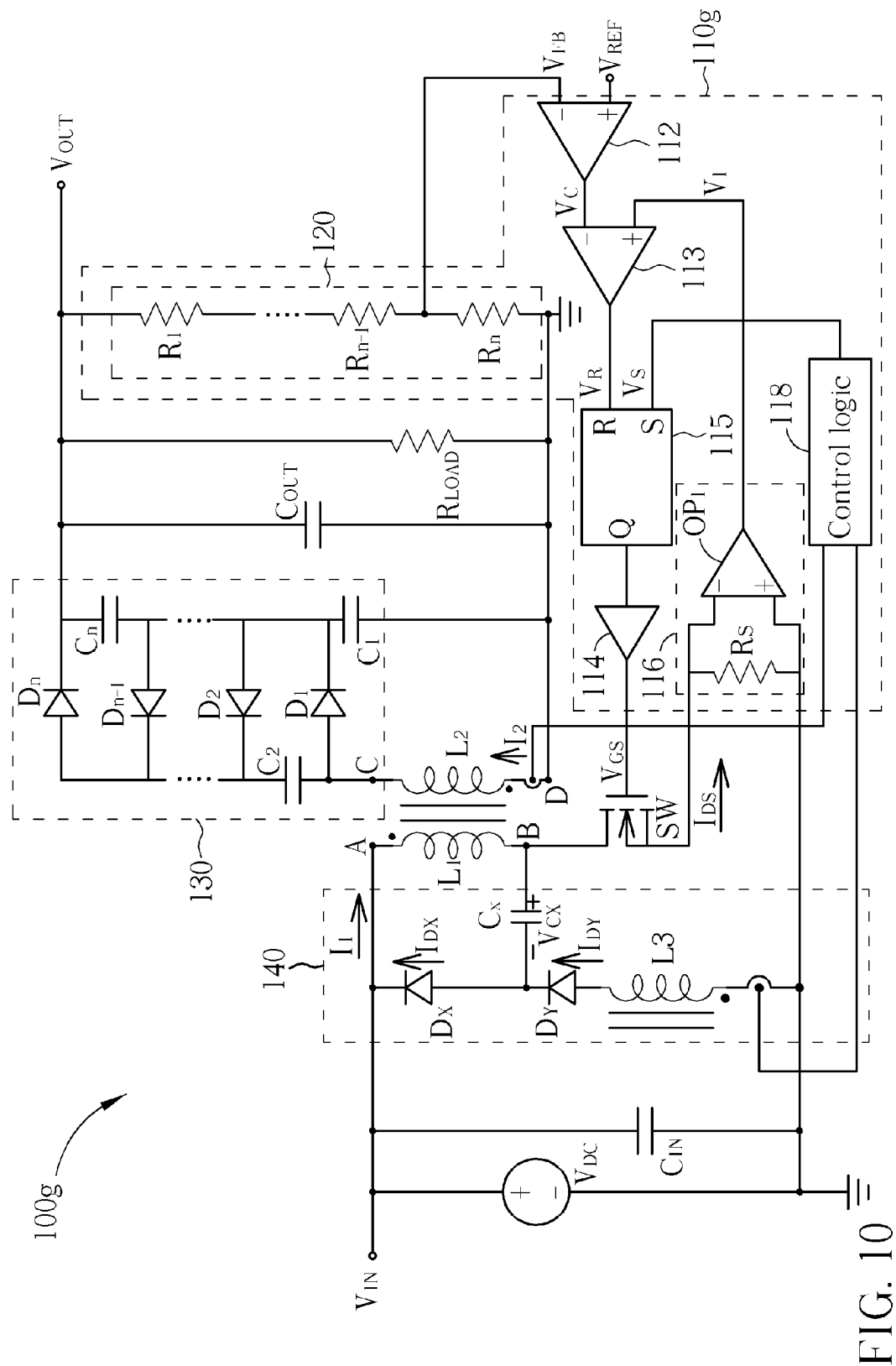

FIG. 8 illustrates a flyback voltage converter 100e according to a fifth embodiment of the present invention, FIG. 9 illustrates a flyback voltage converter 100f according to a sixth embodiment of the present invention, and FIG. 10 illustrates a flyback voltage converter 100g according to a seventh embodiment of the present invention. The flyback voltage converters 100e, 100f and 100g each includes a voltage source $V_{DC}$, a first electromagnetic device L1, a second electromagnetic device L2, a power switch SW, a charge pump 130, and a snubber circuit 140. The flyback voltage converters 100e, 100f and 100g also include switch control units 110e, 110f and 110g, respectively. The first, fifth, sixth and seventh embodiments of the present invention have similar structures, but differ in how the switch control units 110a 100e, 100f and 100g are coupled to the snubber circuit 140. In the switch control unit 110a according to the first embodiment of the present invention, the control logic 118 is coupled to both ends of the third electromagnetic device L3; in the switch control unit 110e according to the fifth embodiment of the present invention, the control logic 118 is coupled to the first end of the first electromagnetic device L1 and the second end of the third electromagnetic device L3; in the switch control unit 110f according to the sixth embodiment of the present invention, the control logic 118 is coupled to the first end of the first electromagnetic device L1 and the first end of the second electromagnetic device L2; in the switch control unit 110g according to the seventh embodiment of the present invention, the control logic 118 is coupled to the first end of the third electromagnetic device L3 and the first end of the second electromagnetic device L2.

Meanwhile, in the embodiment illustrated in FIG. 7, the switch control unit 110d may also adopt the feedback method as depicted in FIGS. 5 and 6; in the embodiments illustrated in FIGS. 5-7, the switch control units 110b-110d may also be coupled to the snubber circuit 140 in the same manner as depicted in FIGS. 8-10. In the present invention, the power switch SW is again turned on after entering OFF state by detecting the snubber circuit 140 and the current at the secondary side. The previously illustrated embodiments are merely for illustrative purpose and do not limit the scope of the present invention.

Figure 12:
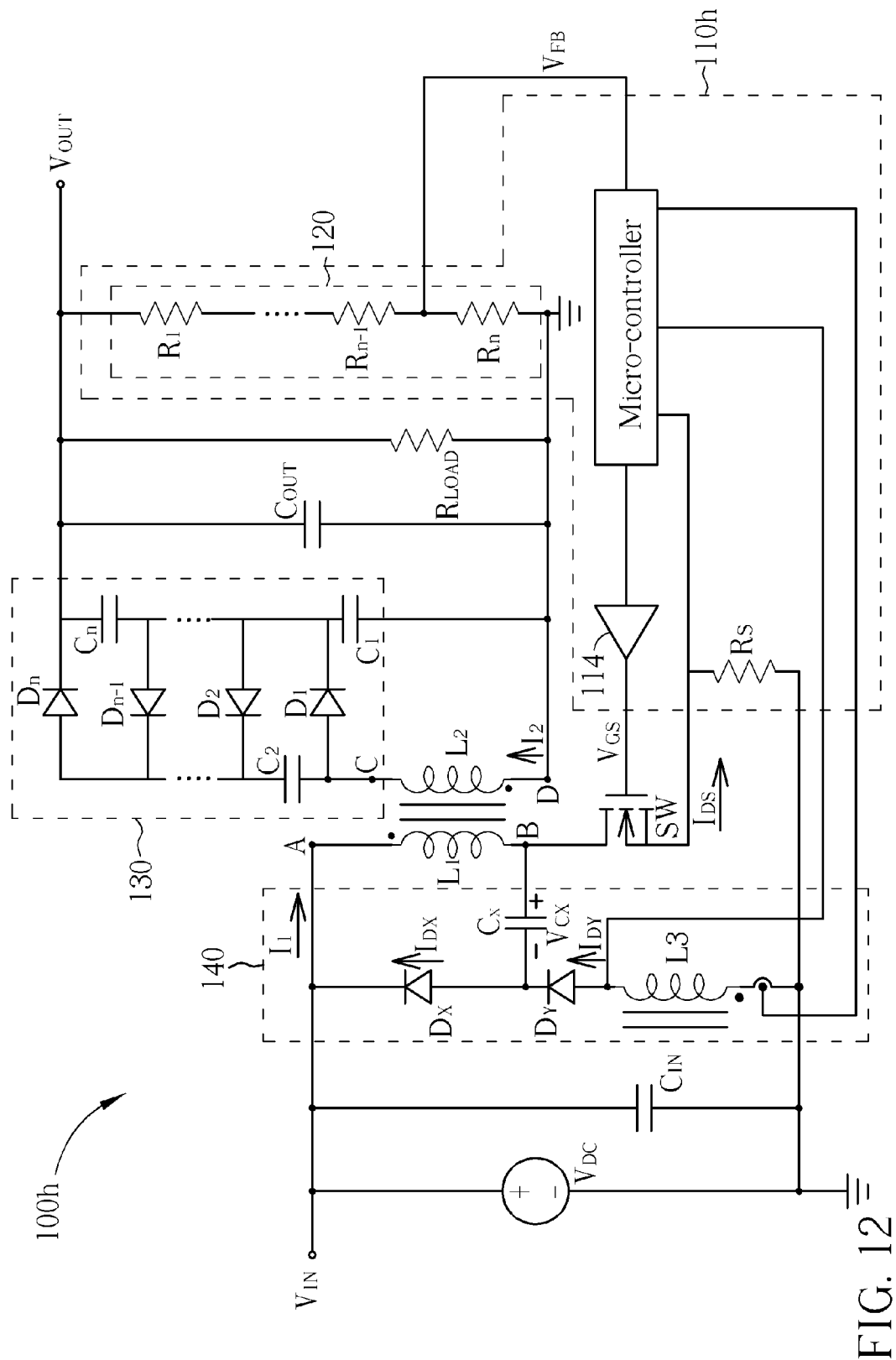
Figure 13:
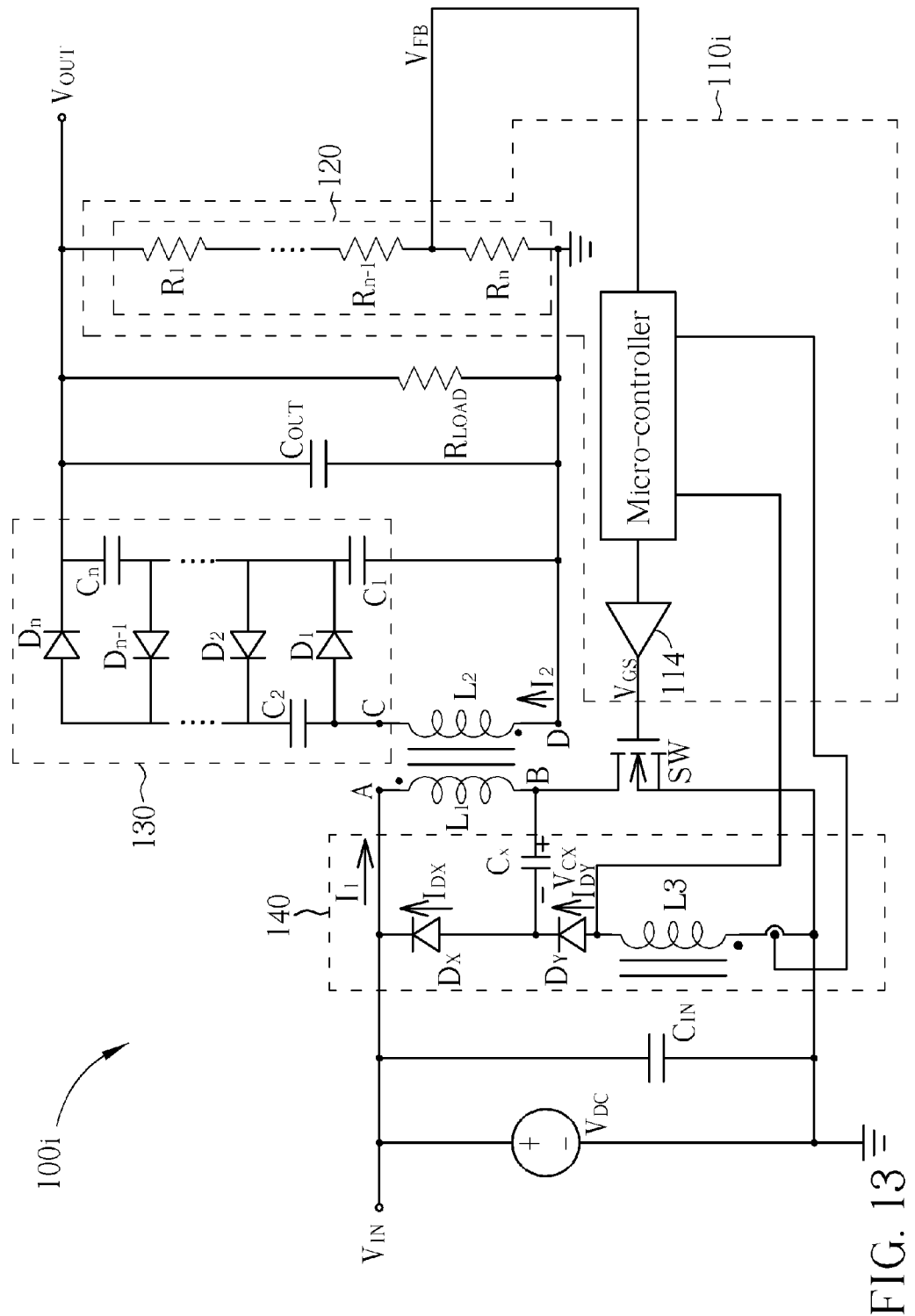

FIG. 12 is a diagram illustrating a flyback voltage converter 100h according to an eighth embodiment of the present invention. FIG. 13 is a diagram illustrating a flyback voltage converter 100i according to a ninth embodiment of the present invention. The embodiments illustrated in FIGS. 12 and 13 correspond to those illustrated in FIGS. 4 and 7, respectively. However, in the eighth and ninth embodiments of the present invention, the switch control units 110h and 110i, respectively providing the same function as the switch control units 110a and 110d, are implemented by using the micro-controller and firmware. Also, the switch control unit 110h and 100i may also adopt the feedback method as depicted in FIGS. 5 and 6, and may also be coupled to the snubber circuit 140 in the same manner as depicted in FIGS. 8-10. In the present invention, the power switch SW is again turned on after entering OFF state by detecting the snubber circuit 140 and the current at the secondary side. The previously illustrated embodiments are merely for illustrative purpose and do not limit the scope of the present invention.

In the present invention, the required voltage rating of the secondary side of the transformer can be reduced by using the charge pump, and the leakage inductance energy can be recycled by using the snubber circuit. Therefore, the size of the transformer can be reduced and the efficiency can increase.

Those skilled in the art will readily observe that numerous modifications and alterations of the device and method may be made while retaining the teachings of the invention.

What is claimed is:

1. A voltage converter which converts an input voltage into an output voltage for driving a load, the voltage converter comprising:
    an input end for receiving the input voltage;
    an output end for outputting the output voltage;
    a first electromagnetic device configured to generate a corresponding first current according to the input voltage, the first electromagnetic device comprising:
        a first end coupled to the input end; and
        a second end;
    a second electromagnetic device having a first end and a second end for inducing a voltage corresponding to the first current and providing a second current associated with the output voltage;
    a power switch device coupled to the second end of the first electromagnetic device for controlling a signal transmission path between the second end of the first electromagnetic device and a power supply node according to a switch control signal;
    a snubber circuit coupled between the first end of the first electromagnetic device and the power supply node for storing a leakage inductance energy of the first electromagnetic device and providing a zero-current signal associated with the second current, the snubber circuit comprising:
        a first capacitor including:
            a first end coupled to the second end of the first electromagnetic device; and
            a second end;
        a third electromagnetic device including:
            a first end coupled to the power supply node; and
            a second end;
        a first diode having an anode coupled to the second end of the first capacitor and a cathode coupled to the input end; and
        a second diode having an anode coupled to the second end of the third electromagnetic device and a cathode coupled to the second end of the first capacitor; and
    a switch control unit for generating the switch control signal according to a feedback signal and the zero-current signal.

2. The voltage converter of claim 1 wherein the switch control unit comprises:
    a feedback circuit coupled to the output end and including a plurality of resistors in series, and configured to provide the feedback signal by voltage-dividing the output voltage;
    an error amplifier configured to generate a first control signal by comparing the feedback signal with a reference signal;
    a current-detecting circuit including:
        a resistor coupled between the power switch and the power supply node; and
        a current amplifier configured to generate a second control signal according to a current flowing through the resistor;
    a control logic coupled to the snubber circuit for receiving the zero-current signal, thereby generating a corresponding third control signal;
    a pulse width modulation (PWM) comparator configured to generate a fourth control signal by comparing the first control signal with the second control signal;
    a flip-flop configured to generate a fifth control signal by comparing the third control signal with the fourth control signal; and
    a driving unit configured to adjust a duty cycle of the switch control signal according to the fifth control signal.

3. The voltage converter of claim 2 wherein the control logic is coupled to the first and the second ends of the third electromagnetic device, and the zero-current is further associated with a current flowing through the third electromagnetic device.

4. The voltage converter of claim 2 wherein the control logic is coupled to the second end of the third electromagnetic device and the input end, and the zero-current is further associated with a current flowing through the input end.

5. The voltage converter of claim 2 wherein the control logic is coupled to the first end of the second electromagnetic device and the input end, and the zero-current is further associated with a current flowing through the input end.

6. The voltage converter of claim 2 wherein the control logic is coupled to the first end of the third electromagnetic device and the first end of the second electromagnetic device, and the zero-current is further associated with a current flowing through the third electromagnetic device.

7. The voltage converter of claim 2 wherein the error amplifier, the PWM comparator, the flip-flop, the current amplifier and the control logic are implemented by using a micro-controller and a firmware.

8. The voltage converter of claim 1 wherein the switch control unit comprises:
  a feedback circuit coupled to the output end and including a plurality of resistors in series, and configured to provide a corresponding feedback voltage by voltage-dividing the output voltage;
  a multiplier coupled to the feedback circuit and the load, and configured to provide the corresponding feedback signal according to the feedback voltage and a current flowing through the load;
  an error amplifier configured to generate a first control signal by comparing the feedback signal with a reference signal;
  a current-detecting circuit including:
    a resistor coupled between the power switch and the power supply node; and
    a current amplifier configured to generate a second control signal according to a current flowing through the resistor;
  a control logic coupled to the snubber circuit for receiving the zero-current signal, thereby generating a corresponding third control signal;
  a PWM comparator configured to generate a fourth control signal by comparing the first control signal with the second control signal;
  a flip-flop configured to generate a fifth control signal by comparing the third control signal with the fourth control signal; and
  a driving unit configured to adjust a duty cycle of the switch control signal according to the fifth control signal.

9. The voltage converter of claim 8 wherein the control logic is coupled to the first and the second ends of the third electromagnetic device, and the zero-current is further associated with a current flowing through the third electromagnetic device.

10. The voltage converter of claim 8 wherein the control logic is coupled to the second end of the third electromagnetic device and the input end, and the zero-current is further associated with a current flowing through the input end.

11. The voltage converter of claim 8 wherein the control logic is coupled to the first end of the second electromagnetic device and the input end, and the zero-current is further associated with a current flowing through the input end.

12. The voltage converter of claim 8 wherein the control logic is coupled to the first end of the third electromagnetic device and the first end of the second electromagnetic device, and the zero-current is further associated with a current flowing through the third electromagnetic device.

13. The voltage converter of claim 8 wherein the multiplier, the error amplifier, the PWM comparator, the flip-flop, the current amplifier and the control logic are implemented by using a micro-controller and a firmware.

14. The voltage converter of claim 1 wherein the switch control unit comprises:
  a multiplier coupled to the input end and configured to provide the corresponding feedback signal according to the input voltage and a current flowing through the input end;
  an error amplifier configured to generate a first control signal by comparing the feedback signal with a reference signal;
  a current-detecting circuit including:
    a resistor coupled between the power switch and the power supply node; and
    a current amplifier configured to generate a second control signal according to a current flowing through the resistor;
  a control logic coupled to the snubber circuit for receiving the zero-current signal, thereby generating a corresponding third control signal;
  a PWM comparator configured to generate a fourth control signal by comparing the first control signal with the second control signal;
  a flip-flop configured to generate a fifth control signal by comparing the third control signal with the fourth control signal; and
  a driving unit configured to adjust a duty cycle of the switch control signal according to the fifth control signal.

15. The voltage converter of claim 14 wherein the control logic is coupled to the first and the second ends of the third electromagnetic device, and the zero-current is further associated with a current flowing through the third electromagnetic device.

16. The voltage converter of claim 14 wherein the control logic is coupled to the second end of the third electromagnetic device and the input end, and the zero-current is further associated with a current flowing through the input end.

17. The voltage converter of claim 14 wherein the control logic is coupled to the first end of the second electromagnetic device and the input end, and the zero-current is further associated with a current flowing through the input end.

18. The voltage converter of claim 14 wherein the control logic is coupled to the first end of the third electromagnetic device and the first end of the second electromagnetic device, and the zero-current is further associated with a current flowing through the third electromagnetic device.

19. The voltage converter of claim 14 wherein the multiplier, the error amplifier, the PWM comparator, the flip-flop, the current amplifier and the control logic are implemented by using a micro-controller and a firmware.

20. The voltage converter of claim 1 wherein the switch control unit comprises:
  a feedback circuit coupled to the output end and including a plurality of resistors in series, and configured to provide the corresponding feedback signal by voltage-dividing the output voltage;
  an error amplifier configured to generate a first control signal by comparing the feedback signal with a reference signal;
  a signal-generating circuit including:
    a second capacitor;
    a current source configured to provide a second control signal by charging the second capacitor;
    a first switch for controlling a charging path of the second capacitor according to a fifth control signal; and
    a second switch for controlling a discharging path of the second capacitor according to a sixth control signal, wherein the fifth and sixth control signals have opposite phases;
  a control logic coupled to the snubber circuit for receiving the zero-current signal, thereby generating a corresponding third control signal;
  a PWM comparator configured to generate a fourth control signal by comparing the first control signal with the second control signal;
  a flip-flop configured to generate a fifth control signal by comparing the third control signal with the fourth control signal; and a driving unit configured to adjust a duty cycle of the switch control signal according to the fifth control signal.

21. The voltage converter of claim 20 wherein the control logic is coupled to the first and the second ends of the third electromagnetic device, and the zero-current is further associated with a current flowing through the third electromagnetic device.

22. The voltage converter of claim 20 wherein the control logic is coupled to the second end of the third electromagnetic device and the input end, and the zero-current is further associated with a current flowing through the input end.

23. The voltage converter of claim 20 wherein the control logic is coupled to the first end of the second electromagnetic device and the input end, and the zero-current is further associated with a current flowing through the input end.

24. The voltage converter of claim 20 wherein the control logic is coupled to the first end of the third electromagnetic device and the first end of the second electromagnetic device, and the zero-current is further associated with a current flowing through the third electromagnetic device.

25. The voltage converter of claim 20 wherein the error amplifier, the signal-generating circuit, the PWM comparator, the flip-flop, and the control logic are implemented by using a micro-controller and a firmware.

26. The voltage converter of claim 1 wherein the switch control unit comprises:
a feedback circuit coupled to the output end and including a plurality of resistors in series, and configured to provide a corresponding feedback voltage by voltage-dividing the output voltage;
a multiplier coupled to the feedback circuit and the load, and configured to provide the corresponding feedback signal according to the feedback voltage and a current flowing through the load;
an error amplifier configured to generate a first control signal by comparing the feedback signal with a reference signal;
a signal-generating circuit including:
a second capacitor;
a current source configured to provide a second control signal by charging the second capacitor;
a first switch for controlling a charging path of the second capacitor according to a fifth control signal; and
a second switch for controlling a discharging path of the second capacitor according to a sixth control signal, wherein the fifth and sixth control signals have opposite phases;
a control logic coupled to the snubber circuit for receiving the zero-current signal, thereby generating a corresponding third control signal;
a PWM comparator configured to generate a fourth control signal by comparing the first control signal with the second control signal;
a flip-flop configured to generate a fifth control signal by comparing the third control signal with the fourth control signal; and
a driving unit configured to adjust a duty cycle of the switch control signal according to the fifth control signal.

27. The voltage converter of claim 26 wherein the control logic is coupled to the first and the second ends of the third electromagnetic device, and the zero-current is further associated with a current flowing through the third electromagnetic device.

28. The voltage converter of claim 26 wherein the control logic is coupled to the second end of the third electromagnetic device and the input end, and the zero-current is further associated with a current flowing through the input end.

29. The voltage converter of claim 26 wherein the control logic is coupled to the first end of the second electromagnetic device and the input end, and the zero-current is further associated with a current flowing through the input end.

30. The voltage converter of claim 26 wherein the control logic is coupled to the first end of the third electromagnetic device and the first end of the second electromagnetic device, and the zero-current is further associated with a current flowing through the third electromagnetic device.

31. The voltage converter of claim 26 wherein the multiplier, the error amplifier, the signal-generating circuit, the PWM comparator, the flip-flop and the control logic are implemented by using a micro-controller and a firmware.

32. The voltage converter of claim 1 wherein the switch control unit comprises:
a multiplier coupled to the input end and configured to provide the corresponding feedback signal according to the input voltage and a current flowing through the input end;
an error amplifier configured to generate a first control signal by comparing the feedback signal with a reference signal;
a signal-generating circuit including:
a second capacitor;
a current source configured to provide a second control signal by charging the second capacitor;
a first switch for controlling a charging path of the second capacitor according to a fifth control signal; and
a second switch for controlling a discharging path of the second capacitor according to a sixth control signal, wherein the fifth and sixth control signals have opposite phases;
a control logic coupled to the snubber circuit for receiving the zero-current signal, thereby generating a corresponding third control signal;
a PWM comparator configured to generate a fourth control signal by comparing the first control signal with the second control signal;
a flip-flop configured to generate a fifth control signal by comparing the third control signal with the fourth control signal; and
a driving unit configured to adjust a duty cycle of the switch control signal according to the fifth control signal.

33. The voltage converter of claim 32 wherein the control logic is coupled to the first and the second ends of the third electromagnetic device, and the zero-current is further associated with a current flowing through the third electromagnetic device.

34. The voltage converter of claim 32 wherein the control logic is coupled to the second end of the third electromagnetic device and the input end, and the zero-current is further associated with a current flowing through the input end.

35. The voltage converter of claim 32 wherein the control logic is coupled to the first end of the second electromagnetic device and the input end, and the zero-current is further associated with a current flowing through the input end.

36. The voltage converter of claim 32 wherein the control logic is coupled to the first end of the third electromagnetic device and the first end of the second electromagnetic device, and the zero-current is further associated with a current flowing through the third electromagnetic device.

37. The voltage converter of claim 32 wherein the multiplier, the error amplifier, the signal-generating circuit, the PWM comparator, the flip-flop and the control logic are implemented by using a micro-controller and a firmware.

38. The voltage converter of claim 1 further comprising a charge pump configured to provide the output voltage by storing energy in multiple stages.

39. The voltage converter of claim 38 wherein the charge pump includes a plurality of capacitors and diodes.

* * * * *